(12) United States Patent
Liu et al.

(10) Patent No.: US 9,431,895 B2
(45) Date of Patent: Aug. 30, 2016

(54) HIGH POWER-FACTOR CONTROL CIRCUIT AND POWER SUPPLY

(71) Applicant: Shanghai SIM-BCD Semiconductor Manufacturing Co., Ltd., Shanghai (CN)

(72) Inventors: Na Liu, Shanghai (CN); Zeqiang Chen, Shanghai (CN); Yajiang Zhu, Shanghai (CN); Jianhua Duan, Shanghai (CN); Chao Deng, Shanghai (CN); Zhimin Hu, Shanghai (CN); Siyuan Xu, Shanghai (CN)

(73) Assignee: Shanghai SIM-BCD Semiconductor Manufacturing Co., Ltd., Shanghai (CN)

( * ) Notice: Subject to any disclaimer, the term of this patent is extended or adjusted under 35 U.S.C. 154(b) by 157 days.

(21) Appl. No.: 14/493,338

(22) Filed: Sep. 22, 2014

(65) Prior Publication Data

US 2016/0087523 A1    Mar. 24, 2016

(51) Int. Cl.
*H02M 1/08*   (2006.01)
*H02M 1/42*   (2007.01)
*H02M 3/335*  (2006.01)

(52) U.S. Cl.
CPC ....... *H02M 1/4208* (2013.01); *H02M 3/33507* (2013.01)

(58) Field of Classification Search
CPC .................................................. H02M 1/08
USPC ............................. 323/282, 285; 363/95, 97
See application file for complete search history.

(56) References Cited

U.S. PATENT DOCUMENTS

| 9,293,981 | B2 * | 3/2016 | Zhang | H02M 1/36 |
| 2006/0239049 | A1 * | 10/2006 | Melai | H02M 1/4225 363/125 |
| 2010/0301821 | A1 * | 12/2010 | Kung | H02M 3/33523 323/283 |
| 2011/0063879 | A1 * | 3/2011 | Murata | H02M 3/33523 363/21.13 |
| 2014/0252975 | A1 * | 9/2014 | Drakshapalli | H02M 3/33507 315/210 |
| 2015/0280592 | A1 * | 10/2015 | Hu | H02M 3/156 363/21.04 |
| 2016/0087523 | A1 * | 3/2016 | Liu | H02M 1/4208 363/21.12 |

* cited by examiner

*Primary Examiner* — Jeffrey Sterrett
(74) *Attorney, Agent, or Firm* — Kilpatrick Townsend & Stockton LLP

(57) ABSTRACT

An SMPS received a rectified periodic input line voltage and is configure to provide a regulated output. A power switch has a constant turn-on time in a given cycle of the rectified periodic input line voltage. A maximum value of the envelope of peak currents through the power switch is determined and is compared with a reference value, and the power switch turn-on time in the next cycle is adjusted accordingly. The output of the power supply is regulated to a target output value, and the current is in phase with the periodic input line voltage, resulting in a high power factor. No sampling of the line voltage is needed to maintain the high power factor. A controller chip can have as few as five pins. Alternatively, a seven-pin controller chip can have two external resistors for selecting operations in either Boundary Conduction Mode (BCM) or Discontinuous Conduction Mode (DCM).

23 Claims, 16 Drawing Sheets

HIGH POWER-FACTOR CONTROL CIRCUIT AND POWER SUPPLY

CROSS-REFERENCES TO RELATED APPLICATIONS

This application is related to Chinese patent application No. 201310273298.9, filed on Jul. 2, 2013, and published on Oct. 2, 2013 as Chinese patent publication No. CN103337943A, by the same inventors and having substantially the same content as the present application, which is commonly owned and incorporated by reference herein in its entirety.

BACKGROUND OF THE INVENTION

The present invention relates generally to the field of switch mode power supply (SMPS). More particularly, embodiments of the present invention relate to SMPS for providing a constant output current for light emitting diode (LED) lighting applications.

Switch mode power supply (SMPS) systems have many advantages over convention linear regulated power supplies. These advantages include smaller volume, better stability, and higher power efficiency. As a result, SMPS has found wide spread applications, such as televisions, set-top boxes, and video recorders, portable telephone chargers, personal digital assistants (PDAs), and even certain automated tooth brushes. In recently years, as light emitting diode (LED) technologies are becoming more prevalent, SMPS is widely used as drivers for LED devices, including in white-light bulb replacement applications.

Unlike convention incandescent light bulbs, LEDs lighting devices do not behave like a purely resistive load in an AC circuit. Therefore, conventional LED light bulbs often do not provide desirable efficiency in the utilization of the AC power supply, which can be measured by "power factor." As used herein, the power factor of an AC electric power system refers to the ratio of the real power flowing to the load to the apparent power in the circuit. Real power is the capacity of the circuit for performing work in a particular time, and apparent power is the product of the current and voltage of the circuit. A recent U.S. energy efficiency standard requires an LED with greater than 5 W power rating to have a power factor no lower than 0.7. An European standard requires an LED with more than 25 W to have a power factor higher than 0.94.

BRIEF SUMMARY OF THE INVENTION

The inventors have observed that conventional switched mode power supplies for driving LED lighting systems suffer from many limitations. For example, conventional LED light bulbs often do not provide desirable efficiency in the utilization of the AC power as measured by "power factor." Further, conventional techniques for improving the power factor often involves sampling of the line voltage. Thus, the circuits is often complicated, and the performance of the power supply can be susceptible to the noise and instability of the line voltage.

According to embodiments of the present invention, in a switch mode power supply (SMPS), a power switch has a constant turn-on time in a given cycle of rectified periodic input line voltage. A maximum value of the envelope of peak currents through the power switch is determined and is compared with a reference signal. The power switch turn-on time in the next cycle is adjusted according to the result of the comparison. The output of the power supply is regulated to a desired output value and is in phase with the periodic input line voltage to provide a high power factor. No sampling of the line voltage is needed to maintain the high power factor, thus avoiding noise and instability. A controller chip can have as few as five pins. Alternatively, a seven-pin controller chip can have two external resistors for adjusting the output and for selecting operation in either the Boundary condition mode (BCM) or the Discontinuous Conduction Mode (DCM).

According to embodiments of the present invention, a controller is provided for controlling a switched mode power supply (SMPS) that is configured to receive a rectified periodic input voltage. The controller includes a first input terminal for receiving information about a current flow through a power switch in the SMPS, a second input terminal for receiving information about an output of the SMPS, and an output terminal for providing a control signal to the power switch of the SMPS for turning on/off of the power switch multiple times in a cycle of the rectified periodic input voltage. The controller is configured to provide a constant power switch turn-on time in a given cycle of the rectified periodic input voltage, and the controller is configured to determine a maximum value of the envelope of peak currents through the power switch in the given cycle, the envelope of peak currents through the power switch being in phase with the rectified periodic input voltage. The controller is also configured to maintain a constant output of the SMPS by adjusting the power switch turn-on time for the next cycle of the rectified periodic input voltage based on comparison of a first reference signal with the determined maximum value of the envelope of peak currents through the power switch in the given cycle.

In an embodiment of the above controller, the controller is configured to increase the power switch turn-on time for the next cycle, when the maximum value of the envelope of peak currents through the power switch in the given cycle is lower than the first reference signal. The controller is configured to decrease the power switch turn-on time for the next cycle, when the maximum value of the envelope of peak currents through the power switch in the given cycle is higher than the first reference signal.

In another embodiment of the controller, the power switch turn-on time for the given cycle, $Tonp(N)$ for the Nth cycle, the power switch turn-on time for the next cycle, $Tonp(N+1)$ for the $(N+1)$th cycle, the first reference signal $Vref1$, and maximum value of the envelope of peak currents through the power switch in the given cycle $Vcspeak$ are related by the following equation, $$Tonp(N+1)/Tonp(N)=Vref1/Vcspeak.$$

In another embodiment, the controller is implemented in a single integrated circuit (IC) chip. The controller IC chip has a first resistor pin for coupling to an external charging resistor and a second resistor pin for coupling to an external discharging resistor. When the resistance of the charging resistor is equal to or smaller than the resistance of the discharging resistor, the power supply is configured to operate in boundary conduction mode (BCM). When the resistance of the charging resistor is greater than the resistance of the discharging resistor, the power supply is configured to operate in discontinuous conduction mode (DCM).

In another embodiment, the controller also includes a power switch on-time adjustment circuit that includes a first capacitor, a charging current source for charging the first capacitor, and a discharging current source for discharging the first capacitor. The charging current source is configured to provide a charging current that is related to the maximum value of the envelope of peak currents through the power switch. The discharging current source is configured to provide a discharging current that is related to the first reference signal. The power switch on-time adjustment circuit also includes a comparator configured for comparing a voltage of the capacitor with a reference voltage, and configured for outputting a signal that is used to determine the power switch turn-on time for the next cycle of the rectified periodic input voltage.

In another embodiment, the power switch on-time adjustment circuit also includes a first switch coupled between the charging current source and the first capacitor, and a second switch coupled between the discharging current source and the first capacitor. The first switch is coupled to the power switch turn-on time for the next cycle of the rectified periodic input voltage, and the second switch is coupled to the power switch turn-on time for the given cycle of the rectified periodic input voltage.

In another embodiment, the controller also includes a power switch turn-off control circuit that includes a second capacitor, a bias current source, a first switch coupling the second capacitor to a ground, and a second switch coupling the second capacitor to the bias current source. The first switch is controlled by the power switch turn-on time for the given cycle of the rectified periodic input line voltage. The second switch is controlled by the power switch turn-on time for the next cycle of the rectified periodic input line voltage. The power switch turn-off control circuit also includes a holding circuit coupled to the second capacitor and a third capacitor coupled to the holding circuit.

In another embodiment, the controller also includes a power switch turn-on control circuit that includes, a timing capacitor, a charging current source coupled to the timing capacitor and a discharging charging current source coupled to the timing capacitor. The charging current source is coupled to a signal representing a current in the power switch and a charging resistor. The discharging current source is coupled to the first reference signal and a discharging resistor. The power switch turn-on control circuit also includes a comparator configured for comparing a voltage of the timing capacitor with a second reference signal, and configured for outputting a signal used in providing a power switch turn-on signal. In a specific embodiment, when the charging resistor is not greater than the discharging resistor, the power supply is configured to operate in boundary conduction mode (BCM). When the charging resistor is greater than the discharging resistor, the power supply is configured to operate in discontinuous conduction mode (DCM).

In another embodiment of the controller, the charging current source is coupled to the timing capacitor through a first switch, and the discharging charging current source is coupled to the timing capacitor through a second switch. The first switch in the power switch turn-on control circuit is coupled to an inverse of a secondary turn-on signal, and the second switch in the power switch turn-on control circuit is coupled to the secondary turn-on signal.

In another embodiment of the controller, the discharging current source is coupled to the timing capacitor through a switch, and the switch is coupled to a secondary turn-on signal.

In another embodiment, the controller is implemented in a single integrated circuit chip with the charging resistor and the discharging resistor implemented on chip. The integrated circuit chip has only five pins: a first input pin for receiving information about the current flow through the power switch, a second input pin for receiving information about the output of the SMPS, an output pin for providing the control signal to a power switch of the SMPS, a power supply pin, and a ground pin.

In another embodiment, the controller is implemented in a single integrated circuit chip with the charging resistor and the discharging resistor disposed external to the integrated circuit chip. The integrated circuit chip has seven pins: a first input pin for receiving information about the current flow through the power switch, a second input pin for receiving information about the output of the SMPS, an output pin for providing a control signal to a power switch of the SMPS, a power supply pin, a ground pin, a first resistor pin for coupling to the external charging resistor, and a second resistor pin for coupling to the external discharging resistor.

According to alternative embodiments of the present invention, a switched mode power supply (SMPS) includes a rectifying circuit for converting an AC input voltage to a rectified periodic input voltage, an energy transfer unit including at least an inductor for coupling to the rectified periodic input voltage and for providing an output to a load, a power switch coupled to the energy transfer unit for controlling a current flow in the inductor, and a controller coupled to the power switch for controlling the o the power switch. The controller is configured to provide a constant power switch turn-on time in a given cycle of the rectified periodic input voltage, and the controller is configured to determine a maximum value of the envelope of peak currents through the power switch in the given cycle, the envelope of peak currents through the power switch being in phase with the rectified periodic input voltage. The controller is also configured to maintain a constant output of the SMPS by adjusting the power switch turn-on time for the next cycle of the rectified periodic input voltage based on comparison of a first reference signal with the determined maximum value of the envelope of peak currents through the power switch in the given cycle.

In an embodiment of the above SMPS, the power switch turn-on time for the given cycle Tonp(N), the power switch turn-on time for the next cycle Tonp(N+1), the first reference signal Vref1, and maximum value of the envelope of peak currents through the power switch in the given cycle Vcspeak are related by the following equation, $$Tonp(N+1)/Tonp(N)=Vref1/Vcspeak.$$

In another embodiment, the controller is implemented in a single integrated circuit (IC) chip. The controller IC chip has a first resistor pin for coupling to an external charging resistor and a second resistor pin for coupling to an external discharging resistor. When the charging resistor is equal to or smaller than the discharging resistor, the power supply is configured to operate in boundary conduction mode (BCM). When the charging resistor is greater than the discharging resistor, the power supply is configured to operate in discontinuous conduction mode (DCM).

In another embodiment, the controller also includes a power switch on-time adjustment circuit that includes a first capacitor, a charging current source for charging the first capacitor, and a discharging current source for discharging the first capacitor. The charging current source is configured to provide a charging current that is related to the maximum value of the envelope of peak currents through the power switch. The discharging current source is configured to provide a discharging current that is related to the first reference signal. The power switch on-time adjustment circuit also includes a comparator configured for comparing a voltage of the capacitor with a reference voltage, and configured for outputting a signal that is used to determine the power switch turn-on time for the next cycle of the rectified periodic input voltage.

In another embodiment, the controller also includes a power switch turn-on control circuit that includes, a timing capacitor, a charging current source coupled to the timing capacitor and a discharging charging current source coupled to the timing capacitor. The charging current source is related to a current in the power switch and a charging resistor. The discharging current source is related to the first reference signal and a discharging resistor. The power switch turn-on control circuit also includes a comparator configured for comparing a voltage of the timing capacitor with a second reference signal, and configured for outputting a signal used in providing a power switch turn-on signal. In a specific embodiment, when the charging resistor is not greater than the discharging resistor, the power supply is configured to operate in boundary conduction mode (BCM). When the charging resistor is greater than the discharging resistor, the power supply is configured to operate in discontinuous conduction mode (DCM).

In another embodiment, the controller is implemented in a single integrated circuit chip with the charging resistor and the discharging resistor implemented on chip. The integrated circuit chip has only five pins: a first input pin for receiving information about the current flow through the power switch, a second input pin for receiving information about the output of the SMPS, an output pin for providing the control signal to a power switch of the SMPS, a power supply pin, and a ground pin.

Depending on the embodiments, the SMPS described above can have different configurations. In an embodiment, the energy transfer unit includes a transformer, and the SMPS is configured as a flyback converter. In another embodiment, the energy transfer unit includes a single inductor, and the SMPS is configured as a high-side buck converter. In still another embodiment, the energy transfer unit includes a transformer, and the SMPS is configured as a low-side buck converter.

A further understanding of the nature and advantages of the present invention may be realized by reference to the remaining portions of the specification and the drawings.

DETAILED DESCRIPTION OF THE INVENTION

Figure 1:
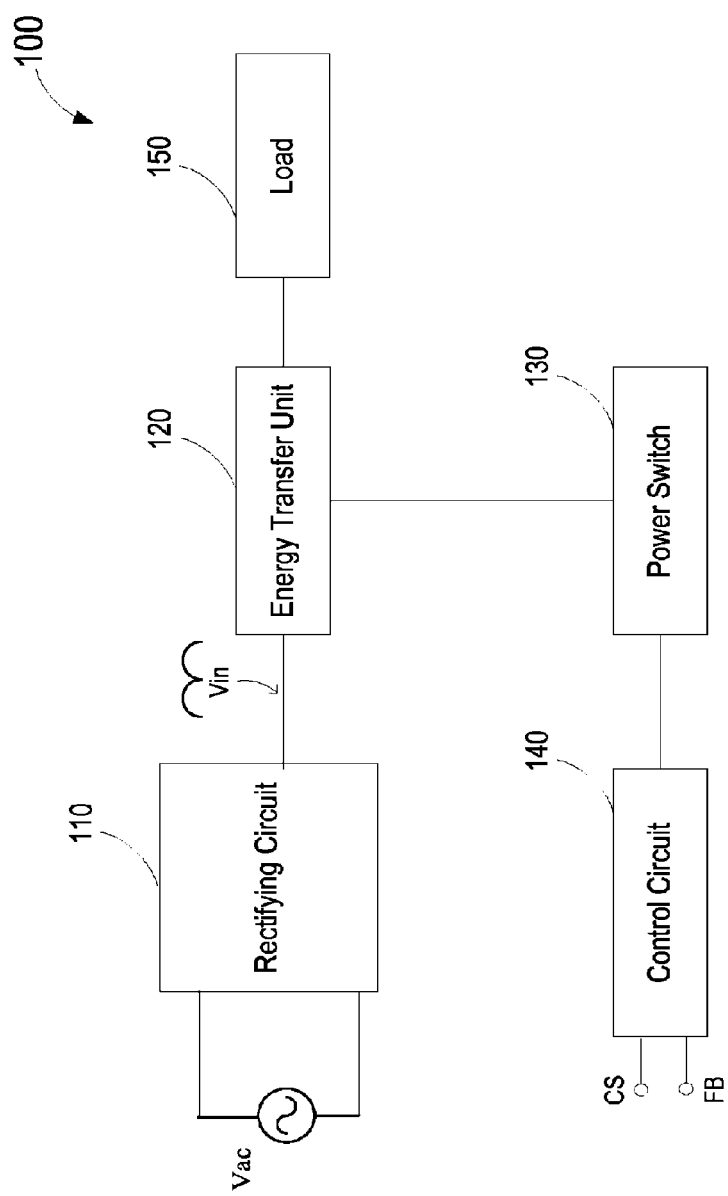
FIG. 1 is a simplified block diagram illustrating a switch mode power supply (SMPS) according to an embodiment of the present invention.

FIG. 1 is a simplified block diagram illustrating a switch mode power supply (SMPS) according to an embodiment of the present invention. As shown in FIG. 1, SMPS 100 includes a rectifier circuit 110, an energy transfer element 120, a power switch 130, and a power switch control circuit 140. Rectifier circuit 110 is configured for receiving an AC voltage Vac, and for providing a periodic rectified line voltage Vin, that is in phase with the input AC voltage Vac. Energy transfer element 120 is coupled to rectifying circuit 110 and an output load 100. Power switch 130 is coupled to an input of the energy transfer element. Power switch control circuit 140 controls the energy transfer element by controlling the on and off of the power switch based on information from at least two inputs, CS and FB. CS is information related to current flow in the power switch and the energy transfer unit, and FB is information related to the output of the power supply. In some embodiments of the invention, the input AC line voltage can have a frequency of, for example, 50-60 Hz, and the controller can operate at a much higher switching frequency, for example, tens of KHz. Therefore, in each cycle of the rectified periodic input voltage, the power switch is turned on and off multiple times. Depending on the embodiment, the components of SMPS can have different circuit implementations. For example, energy transfer unit 120 can include a transformer, coupled inductors, or an inductor-capacitor pair. Depending on the embodiments, power switch 130 can includes power MOSFET, a power bipolar transistor, etc.

In embodiments of the present invention, the SMPS is configured to receive a rectified periodic input line voltage and is configure to provide a regulated output. The power switch has a constant turn-on time in a given cycle of the rectified periodic input line voltage. The inventors of this invention have determined that if the power switch turn-on time Tonp is held constant, then the envelop of primary current peaks follows the rectified input voltage Vin. A maximum value of the envelope of peak currents through the power switch is determined and is compared with a reference value. The power switch turn-on time in the next cycle is adjusted according to the result of the comparison. The output of the power supply is regulated to a target output value, and the current is in phase with the periodic input line voltage, resulting in a high power factor. No sampling of the line voltage is needed to maintain the high power factor, thus avoiding noise and instability. A controller chip can have as few as five pins. Alternatively, a seven-pin controller chip can have two external resistors for adjusting the output and for selecting operations in either the BCM (Boundary Conduction Mode) or DCM (Discontinuous Conduction Mode).

Figure 2:
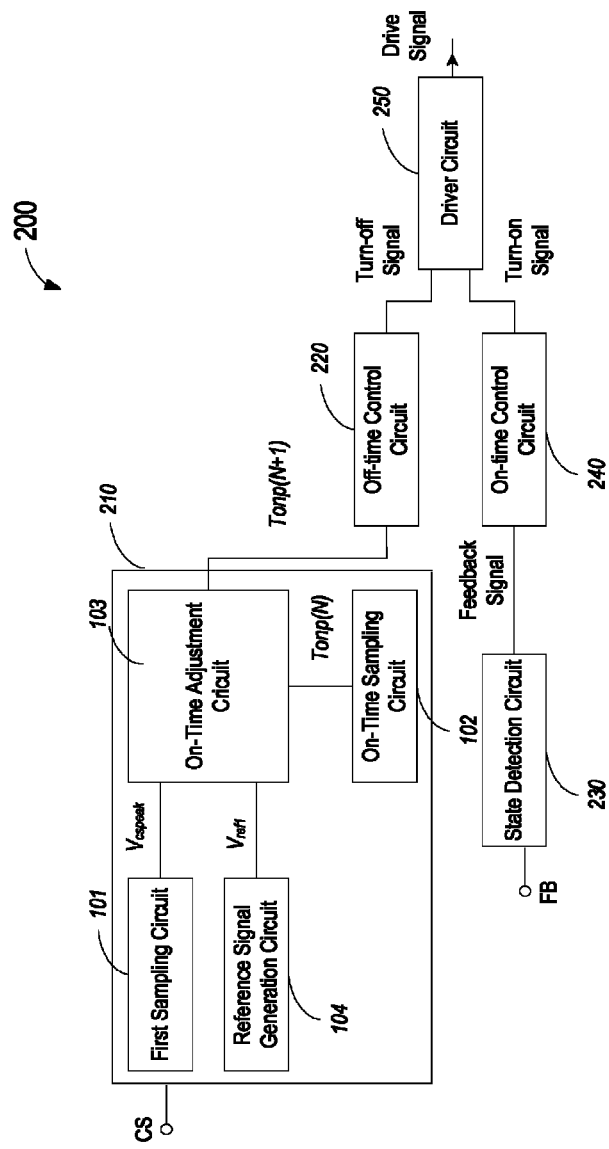
FIG. 2 is a simplified block diagram for a controller for a switch mode power supply according to an embodiment of the present invention.

FIG. 2 is a simplified block diagram for a controller for a switch mode power supply according to an embodiment of the present invention. As shown in FIG. 2, controller 200 includes an on-time generation circuit 210, a power switch turn-off control circuit (also referred to as off-time control circuit) 220, a state detection circuit 230, a power switch turn-on control circuit (also referred to as on-time control circuit) 240, and a drive signal generating circuit 250. On-time generation circuit 210 includes a first sampling circuit 101, an on-time sampling circuit 102, an on-time adjustment circuit 103, and a reference signal generation circuit 104. As described below, on-time generation circuit 210 is configured for generating an on-time duration signal, Tonp(N+1), for the power switch in the next cycle, the (N+1)th cycle.

In FIG. 2, power switch off-time control circuit 220 is coupled to on-time adjustment circuit 103 of on-time generation circuit 210 to generate a control signal for turning off the power switch. State detecting circuit 230 is configured to obtain the state signal of the energy transfer element FB, and it outputs a state feedback signal. Power switch on-time control circuit 240 is connected to state detecting circuit 230 for generating conduction control signals in accordance with the feedback signal to control the power switch turn on time. Drive signal generating circuit 250 is coupled to on time control circuit 240 and off time conduction control circuit 220 to generate power switch on time and off time control signals. The operation of controller 200 is further explained with reference to FIG. 3.

Figure 3:
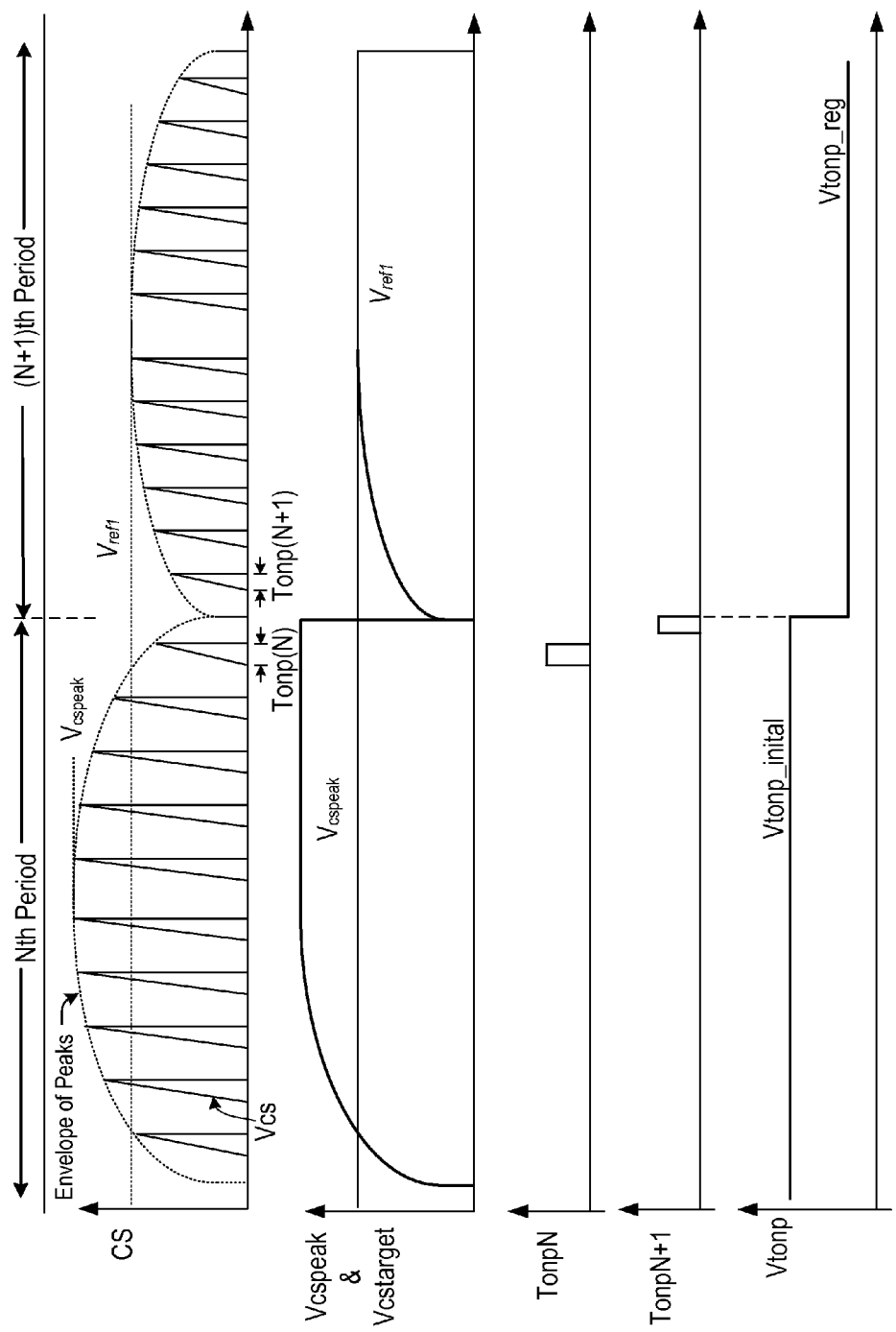
FIG. 3 is a waveform diagram illustrating the operation of the controller in FIG. 2 according to an embodiment of the present invention.

FIG. 3 is a waveform diagram illustrating the operation of controller 200 in FIG. 2. As described above, the controller is configured to provide a control signal to the power switch of the SMPS for turning on/off of the power switch multiple times in a cycle of the rectified periodic input voltage. FIG. 3 shows waveforms of pertinent signals in two consecutive cycles of the rectified periodic input line voltage, the Nth period and the (N+1)th period. In the description below, "period" and "cycle" are used interchangeably in connection with the rectified periodic input line voltage. Five waveforms are shown in FIG. 3, the CS waveform, the Vcspeak & Vcstarget waveform, the TonpN waveform, the TonpN+1 waveform, and the Vtonp waveform. In the CS waveform, Vcs is the voltage signal representing the sensed current through the power switch, which is turned on for a duration Tonp, followed by a duration of off time, in each switching cycle of the controller. In this embodiment, the power switch has a constant turn-on time Tonp in a given cycle of a rectified periodic input line voltage. For example, in the Nth period, the turn-on time is Tonp(N), which can be sampled and determined by the on-time sampling circuit 102 in FIG. 2. Tonp(N) is shown as a pulse in the TonpN waveform. Also shown in the CS waveform is the envelope of the peak points of Vcs. A peak or maximum value of the envelope of the peak points is determined by the first sampling circuit 101 in FIG. 2. The output of the first sampling circuit 101 is shown as Vcspeak. As shown in FIG. 2, power switch on-time adjustment circuit 103 receives Vcspeak and a reference signal Vref1, which is selected according to the desired output of the power supply for a given load. The power switch turn-on time in the next cycle Tonp(N+1) is adjusted according to the result of the comparison. In some embodiments, Vref1/Rcs determines the peak current in the inductance of the energy transfer unit, which determines the system output current, where Rcs is a current sense resistor coupled to the power switch.

As shown in FIG. 3, Vcspeak in the Nth cycle is higher than Vref1, and therefore, the power switch turn-on time Tonp(N+1) is lowered, as shown by the shorter pulse in the TonpN+1 waveform. As a result, the Vcspeak in the (N+1)-th period is lowered to match Vref1 in the (N+1)-th period. Thus, the output of the power supply is regulated to a desired output value. Further, the envelope of the peaks of the current flow in the power supply is in phase with the periodic input line voltage when the power switch has a constant turn-on time in a given cycle of a rectified periodic input line voltage. As a result, the power supply is configured to operate with high power factor.

In some embodiments, as shown in FIG. 3, when Vcspeak>Vref1 in the N-th frequency cycle, on-time adjustment circuit 103 lowers the on-time in the next cycle, Tonp(N+1)<Tonp(N), thereby reducing Vcspeak in the (N+1)th frequency cycle. When Vcspeak<Vref1 in the N-th frequency cycle, on-time adjustment circuit 103 causes Tonp(N+1)>Tonp(N), thereby increasing Vcspeak in the (N+1)th frequency cycle. When Vcspeak=Vref1 in the N-th frequency cycle, on-time adjustment circuit 103 maintains Tonp(N+1)=Tonp(N). Thus, on-time adjustment circuit 103 is configured to cause Vcspeak in the (N+1)th cycle to be close to or equal to the first reference signal Vref1.

Figure 4A:
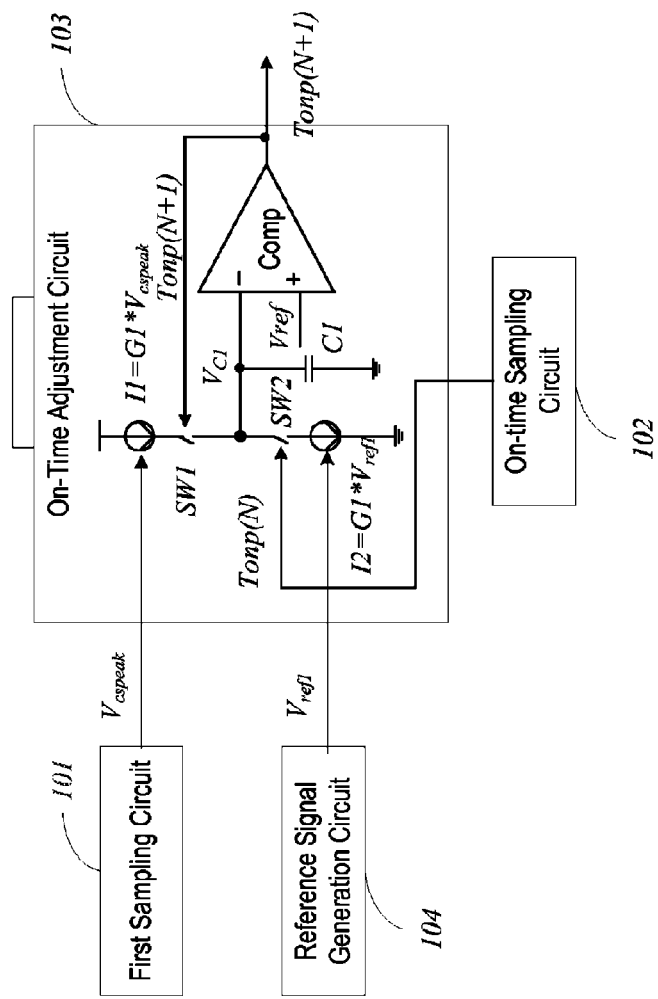
FIG. 4A is a simplified block diagram of on-time generation circuit 210 of the power switch controller of FIG. 2 according to an embodiment of the present invention.
Figure 4C:
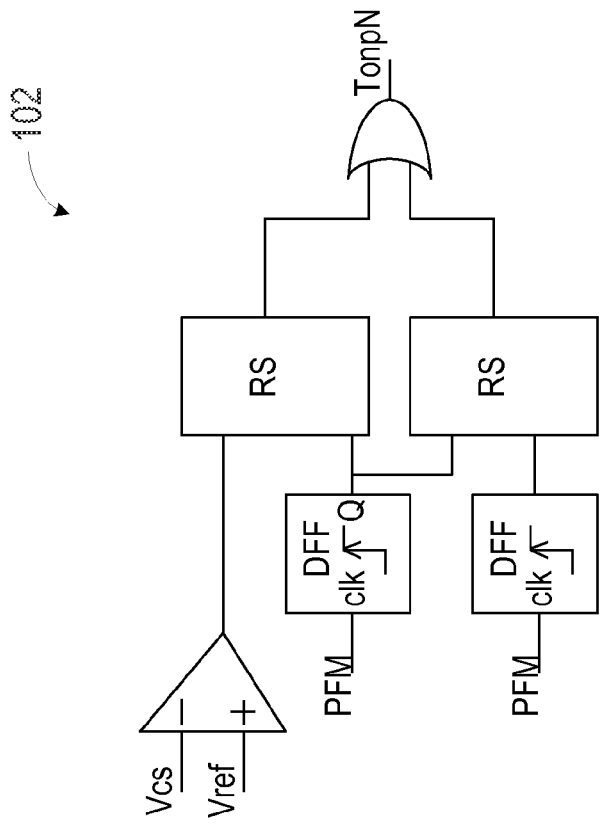
FIG. 4C is an example of on-time sampling circuit 102 of FIG. 4A according to an embodiment of the present invention.
Figure 4B:
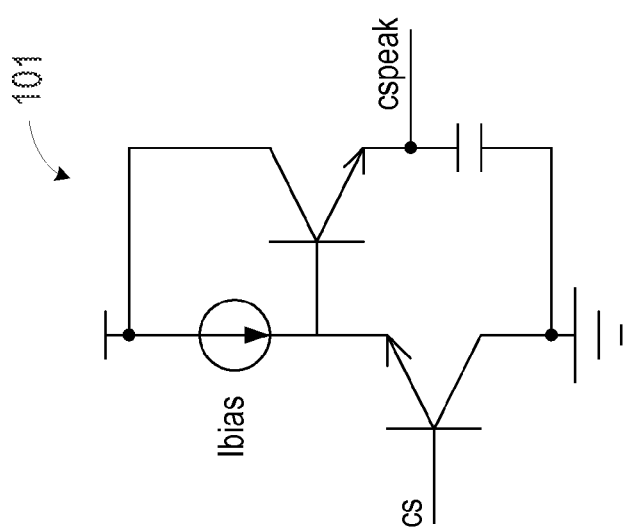
FIG. 4B is an example of first sampling circuit 101 of FIG. 4A according to an embodiment of the present invention.

FIG. 4A is a simplified block diagram of on-time generation circuit 210 of the power switch controller 200 of FIG. 2 according to an embodiment of the present invention. FIG. 4A further includes a circuit diagram of on-time adjustment circuit 103 according to an embodiment of the present invention. FIG. 4B is an example of first sampling circuit 101 of FIG. 2, and FIG. 4C is an example of on-time sampling circuit, according to embodiments of the present invention. The functions of these circuits are explained below.

In the embodiment of FIG. 4A, on-time adjustment circuit 103 includes a comparator COMP with negative input connected to a capacitor C1 and a positive input connected to a reference voltage Vref. Capacitor C1 is configured to be charged by a first current source I1, a charging current source, through a switch SW1. Capacitor C1 is also configured to be discharged by a second current source, a discharging current source, I2 through a switch SW2. As shown in FIG. 4A, I1 is a voltage-controlled current source controlled by signal Vcspeak from first sampling circuit 101, and I2 is a voltage-controlled current source controlled by signal Vref1 from reference signal generation circuit 104. Further, switch SW1 is controlled by Tonp(N+1) from the output of comparator COMP, and switch SW2 is controlled by signal Tonp(N) from on-time sampling circuit 102. In this embodiment, on-time adjustment circuit 103 is configured to produce the next cycle on-time according to the following equation, $$Tonp(N+1)/Tonp(N) = Vref1/Vcspeak$$

FIG. 4B is an example of first sampling circuit 101 of FIG. 4A according to an embodiment of the present invention. In this example, the first sampling circuit 101 includes a bias current source Ibias, a capacitor, and two transistors. The first sampling circuit 101 is configured to receive a signal CS representing the instantaneous current through the power switch and is configured to provide the maximum value of the envelope of peak currents through the power switch Cspeak.

FIG. 4C is an example of on-time sampling circuit 102 of FIG. 4A according to an embodiment of the present invention. As shown in FIG. 4C, on-time sampling circuit 102 includes a comparator for comparing Vcs with Vref, two D flip-flops, two RS flip-flops, and an OR gate. On-time sampling circuit 102 is configured to provide the sampled power switch on-time TonpN in the current cycle of the rectified input voltage.

Figure 5:
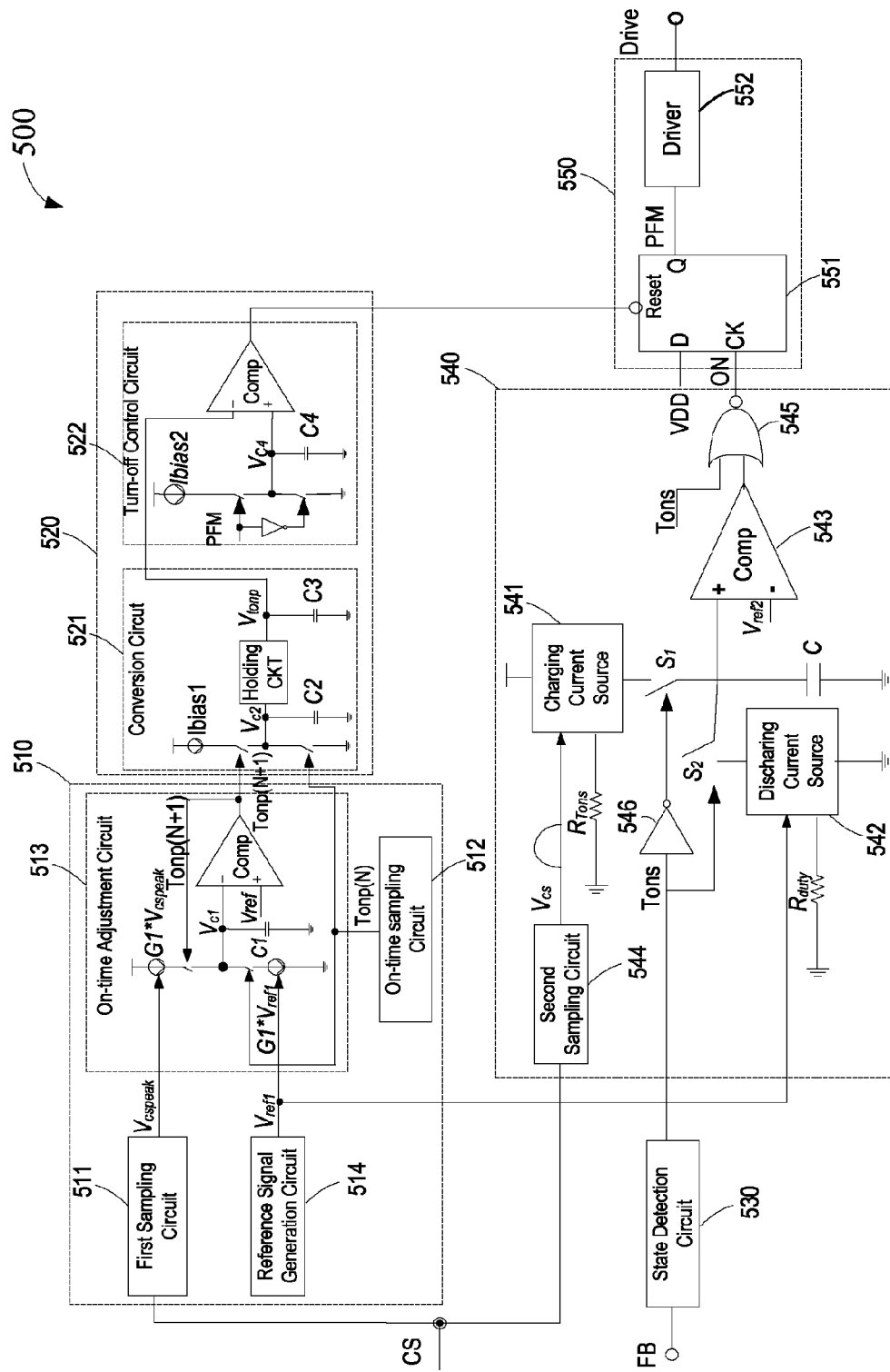
FIG. 5 is a simplified schematic diagram illustrating a SMPS controller according to an embodiment of the present invention.

FIG. 5 is a simplified schematic diagram illustrating a SMPS controller according to an embodiment of the present invention. As shown, controller 500 includes an on-time generation circuit 510, an off-time control circuit 520, a state detecting circuit 530, an on-time control circuit 540, and a drive signal generating circuit 550.

On-time adjustment circuit 510 includes a first sampling circuit 511, an on-time sampling circuit 512, an on-time adjustment circuit 513, and a reference signal generating circuit 514. Their functions and connections are similar to the on-time generation circuits described above in connection with FIGS. 4A-4C. The output of on-time generation circuit 510 is the power switch on-time for time period N+1, Tonp (N+1).

Turn-off control circuit 520 includes a conversion circuit 521 and a turn-off signal generating circuit 522. Conversion circuit 521 is connected to on-time adjustment circuit 513 to receive the power switch conduction time Tonp (N+1) and to generate a voltage signal Vtonp for turning off the power switch at the end of Tonp (N+1). Turn-off signal generating circuit 522, connected to the conversion circuit 521, is configured to generate a turn off control signal based on the power switch off voltage signal Vtonp.

Conversion circuit 521 includes a second capacitor C2 and a bias current source Ibias1. Conversion circuit 521 also includes a first switch coupling the second capacitor to a ground, the first switch being controlled by the power switch turn-on time for the given cycle Tonp(N) of the rectified periodic input line voltage. Conversion circuit 521 also includes a second switch coupling the second capacitor to the bias current source, the second switch being controlled by the power switch turn-on time for the next cycle Tonp (+1) of the rectified periodic input line voltage. Moreover, conversion circuit 521 includes a holding circuit coupled to the second capacitor and a third capacitor coupled to the holding circuit.

In FIG. 5, state detecting circuit 530 is coupled to the energy transfer means to obtain the output state feedback signal FB and to generate a signal Tons.

Power switch turn-on control circuit 540 includes a second sampling circuit 544, an inverter gate 546, a NOR gate 545, a first controllable switch S1, a second controllable switch S2, a timing capacitor C, a charging current source or charging current generating circuit 541, a discharge current source or discharging current generating circuit 542, and a comparator 543.

Second sampling circuit 544 is configured to sample the current of the energy transfer element through the power switch to obtain a second sampling signal Vcs. An input terminal of inverter 546 is connected to the state detecting circuit 530 to obtain the inverse of the feedback signal.

First controllable switch S1 is connected to charging current generation circuit 541 and timing capacitor C, and is controlled by the output from inverter 546, which inverts signal Tons representing a secondary current on time. Second controllable switch S2 is connected to capacitor C and discharge current generating circuit 542, and is controlled by the Tons signal.

Further, the charging current generating circuit 541 and the discharge current generating circuit 542 may be voltage-controlled current sources. Charging current source or charging current generation circuit 541 is coupled to second sampling circuit 544 and a charging resistor $R_{Tons}$ for generating a charging current that is proportional to $V_{cs}/R_{Tons}$, which is the ratio of sampled power switch current signal Vcs over charging resistor $R_{Tons}$. In this embodiment, the charging current can be expressed as $I_1=i1*V_{cs}/R_{Tons}$, where i1 is a constant. Discharging current source or discharging current generating circuit 542 is coupled to reference signal generation circuit 514 and is configured to generate a discharging current that is proportional to $V_{ref1}/R_{duty}$, which is the ratio of reference signal Vref1 and a discharge resistor $R_{duty}$. In this embodiment, the discharging current can be expressed as $I_2=i2*V_{ref1}/R_{duty}$, where i2 is a constant. When first controllable switch S1 is turned on and second controllable switch S2 is turned off, charging current generating circuit 541 generates a charging current to charge capacitor C. When the first controllable switch S1 is turned off and the second controllable switch S2 is turned on, discharge current source or generating circuit 542 generates a discharge current to discharge capacitor C.

Comparator 543 has a first input coupled to timing capacitor C and a second input coupled to the second reference signal $V_{ref2}$ for comparing the voltage Vc at capacitor C with the second reference signal $V_{ref2}$. A first input terminal of NOR gate 545 is coupled to the output of comparator 543. A second input connected to signal Tons, the output of state detection circuit 530. An output end is coupled to the drive signal generating circuit 550.

Drive signal generating circuit 550 includes a flip-flop 551 and a driving circuit 552. Flip-flop 551 is coupled to turn-on control circuit 540 and turn-off control circuit 520 to generate a conduction control PFM (pulsed frequency modulation) signal. Driver circuit 552 is coupled to flip-flop 551 and the power switch to generate a drive signal based on the PFM signal to control the on and off of power switch.

In some embodiments, the energy transfer unit in the SMPS is a transformer, and the current flows through the primary winding of the transformer and the power switch. In the controller of FIG. 5, Vcspeak from first sampling circuit 511 is the peak value of the envelope of the peak current in the primary winding, and Vcs from second sampling circuit 544 is the instantaneous current in the primary winding, Further, the output state of the energy transfer element can be obtained by various methods. When an output, or secondary, rectifying unit is connected between the output of the energy transfer unit and the load unit, the conduction state of the rectifying unit reflects the state of the energy transfer unit. When the rectifying unit is conducting, the energy transfer unit outputs energy. When the rectifying unit is cut off, the energy transfer unit stops outputting energy. Accordingly, the state detecting circuit generates the feedback signal by detecting the conduction state of the output rectifier. In a specific embodiment, the feedback signal is Tons, the conduction time of the secondary rectifier unit.

Figure 6:
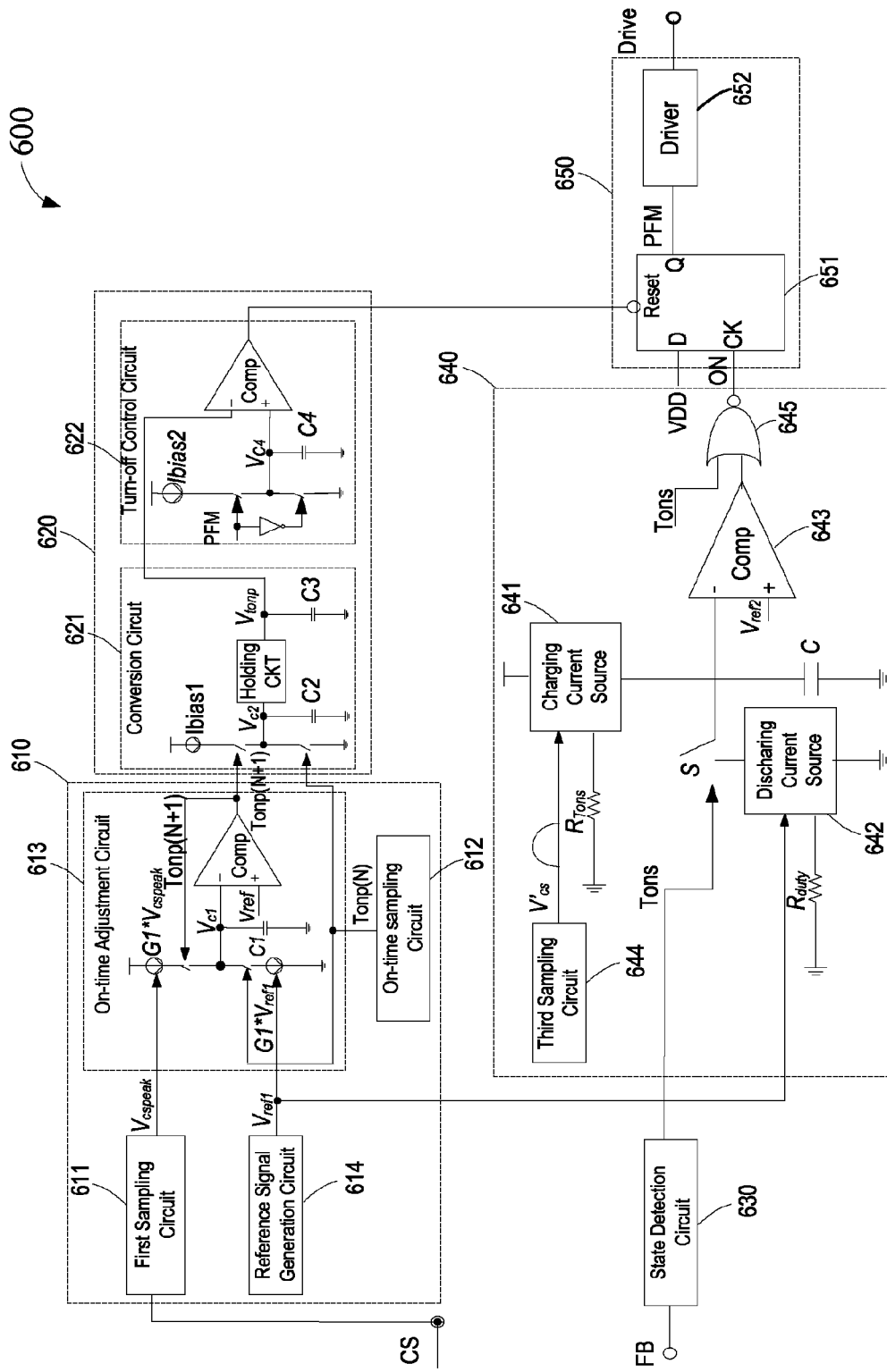
FIG. 6 is a simplified schematic diagram illustrating a SMPS controller according to another embodiment of the present invention.

FIG. 6 is a simplified schematic diagram illustrating a SMPS controller according to another embodiment of the present invention. As shown, controller 600 includes an on-time generation circuit 610, an off-time control circuit 620, a state detecting circuit 630, an on-time control circuit 640, and a drive signal generating circuit 650. It is noted that on-time generation circuit 610, off-time control circuit 620, state detecting circuit 630, and drive signal generating circuit 650 are similar to on-time generation circuit 510, off-time control circuit 520, state detecting circuit 530, and drive signal generating circuit 550, respectively, in FIG. 5. Therefore, the description of the circuit blocks are omitted.

Conduction control circuit 640 in FIG. 6 differs from conduction control circuit 540 in FIG. 5 in that only one switch is coupled to capacitor C in FIG. 6. As shown in FIG. 6, conduction control circuit 640 includes a third sampling circuit 644, NOR gate 645, a controllable switch S, to charge the capacitor C, the charging current generating circuit 641, the discharge current generating circuit 642, and a comparator 643. The third sampling circuit 644 generates a third sampling signal V'cs based on an internal constant current source in the switching power supply control circuit. Controllable switch S is coupled to the input of the discharge current source 642 and a first end of capacitor C. The second end of capacitor C is connected to ground. The state of controllable switch S is controlled by the feedback signal Tons from output of the state detection circuit 630.

An input of charging current generation circuit 641 is coupled to the third sampling circuit 644, and an output is coupled to a first terminal of capacitor C. Charging current generation circuit 641 is used to generate a charging current, which is proportional to the ratio of the third sampled signal V'cs and a charging resistor $R_{Tons}$. Discharge current generating circuit 642 has an output coupled to ground and generates a discharging current, which is proportion to $V_{ref1}/R_{duty}$, the ratio of the reference signal $V_{ref1}$ and the first discharge resistor $R_{duty}$. When the controllable switch S is turned off, the charging current generating circuit 641 generates a charging current to charge the capacitor C. When the controllable switch S is turned on, the discharge current generating circuit 642 generates a discharge current to discharge capacitor C.

Comparator 643 has an inverting terminal coupled to the first terminal of charging capacitor C, and an positive terminal coupled to the second reference phase signal $V_{ref2}$ for comparing the voltage Vc on capacitor C and the second reference signal $V_{ref2}$. NOR gate 645 has a first input terminal coupled to the output terminal of comparator 643, a second input terminal connected to the state detection circuit 630, and an output terminal coupled to the drive signal generating circuit 650.

Figure 8:
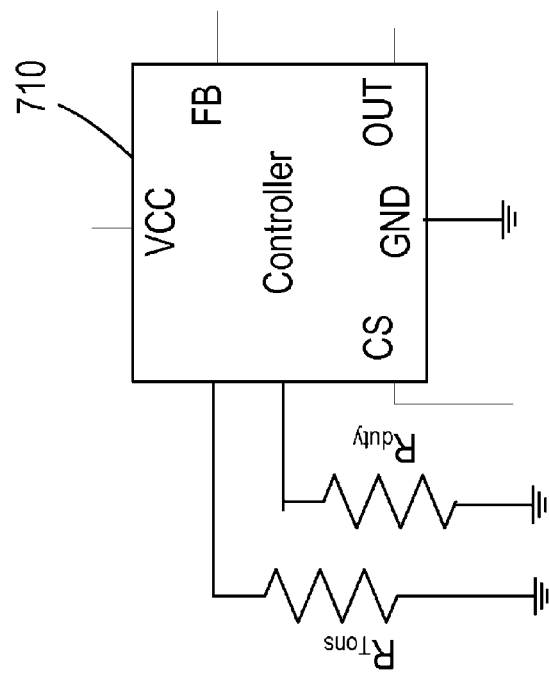
FIGS. 7 and 8 are examples of integrated circuit controllers according to embodiments of the present invention.
Figure 7:
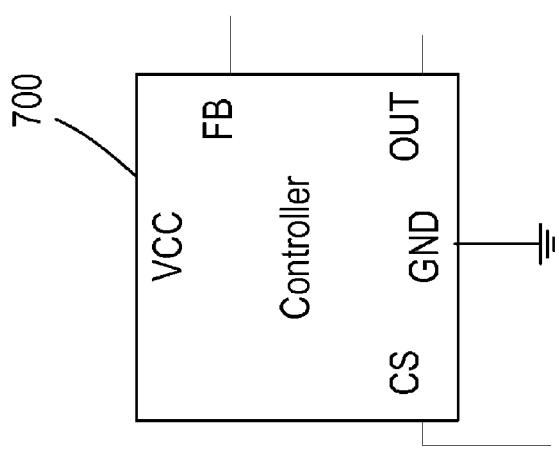

In some embodiments, each of the SMPS controllers depicted in FIGS. 5 and 6 can be implemented in an integrated circuit (IC) chip. FIGS. 7 and 8 illustrate examples of integrated circuit controllers according to embodiments of the present invention. Both controllers have several pins, for example, a CS pin for sensing the current in power switch and the energy transfer unit, an FB pin for receiving the state of the energy transfer unit, an OUT pin for providing a control signal to the power switch, and power supply pins VCC and GND.

In controller 700 of FIG. 7, charging resistor $R_{Tons}$ and discharging resistor $R_{duty}$ are included in the same integrated circuit as the controller circuit. In this example, the controller chip needs only five pins, which can lead to simpler circuit implementation and lower cost. However, the values of charging resistor $R_{Tons}$ and discharging resistor $R_{duty}$ are fixed and cannot be changed. In controller 800 of FIG. 8, charging resistor $R_{Tons}$ and discharging resistor $R_{duty}$ are disposed external to the controller chip. In this case, the relative values of charging resistor $R_{Tons}$ and discharging resistor $R_{duty}$ can be selected to change the operation mode of the switch mode power supply. For example, when the charging resistor $R_{Tons}$ is not greater than the discharging resistor $R_{duty}$ ($R_{Tons} \leq R_{duty}$), the power supply is configured to operate in boundary conduction mode (BCM). On the other hand, when the charging resistor $R_{Tons}$ is greater than the discharging resistor $R_{duty}$ ($R_{Tons} > R_{duty}$), the power supply is configured to operate in discontinuous conduction mode (DCM).

The controllers described above in connection to FIGS. 5-8 can be used in a switch mode power supply (SMPS) 100 of FIG. 1. Depending on the embodiment, the components of SMPS can have different circuit implementations. For example, Depending on the embodiments, power switch 130 can includes power MOSFET, or a power bipolar transistor, etc. Further, energy transfer unit 120 can include a transformer, coupled inductors, or an inductor-capacitor pair. Examples of SMPS with different energy transfer units are described below.

Figure 9:
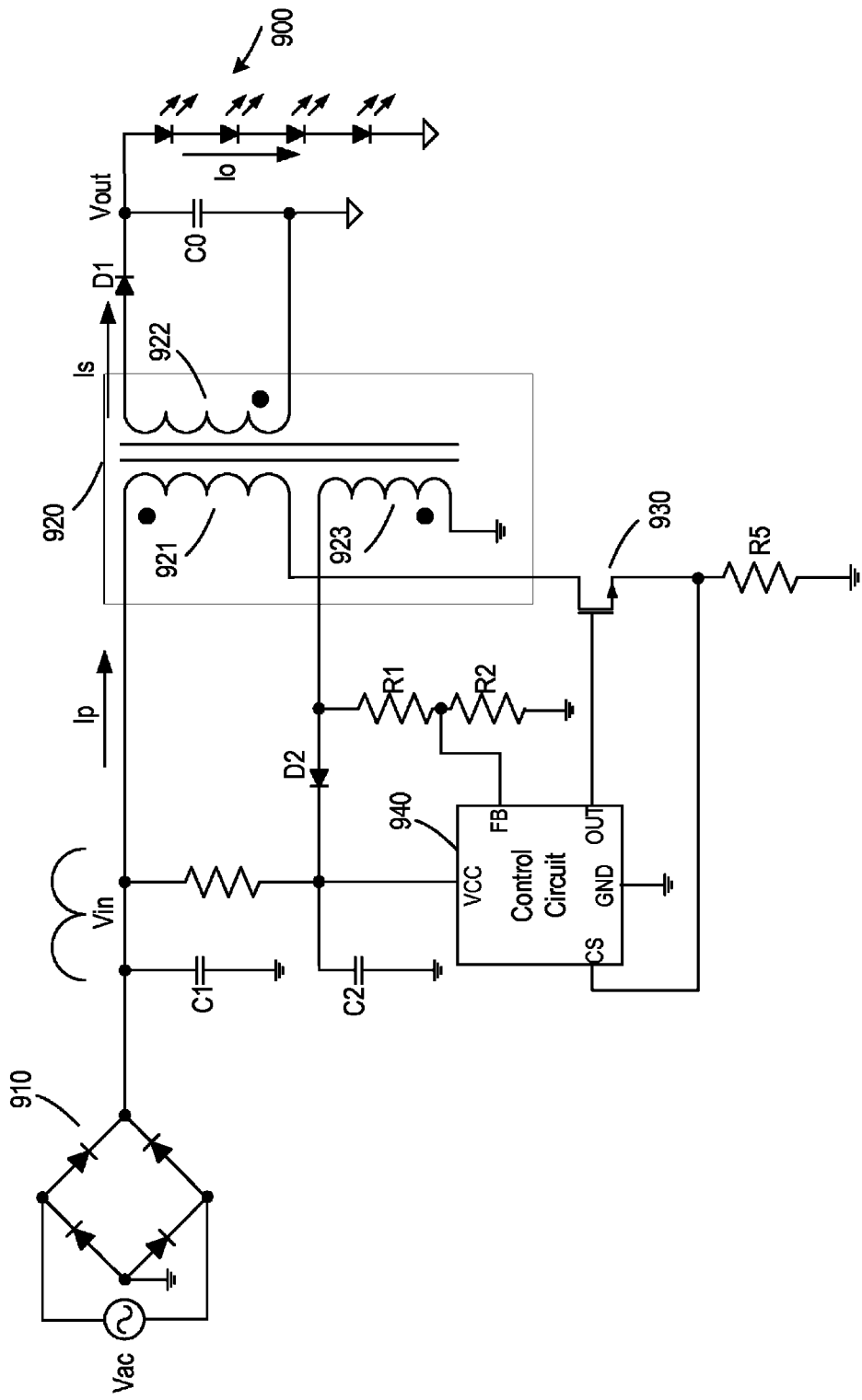
FIG. 9 is a simplified schematic diagram illustrating an SMPS having a transformer as the energy transfer unit according to an embodiment to the present invention.

FIG. 9 is a simplified schematic diagram illustrating an SMPS having a transformer as the energy transfer unit according to an embodiment to the present invention. As shown in FIG. 9, the power supply is configured as a flyback converter, and is configured for driving a load of four light emitting diodes (LEDs) 900 connected in series. Switching power supply includes a rectifier circuit 910, a transformer 920, and a power switch 930, and a control circuit 940 in the form of an integrated chip power switch control circuit as shown in FIG. 7.

As shown in FIG. 9, transformer 920 includes a primary winding 921, a secondary winding 922, and an auxiliary winding 923. Primary winding 921 is connected to rectifier circuit 910. Primary winding 921 is also coupled to power switch 930, which is coupled through a resistor R5 to ground. A common node between power switch 930 and resistor R5 is connected to a first input terminal CS of control circuit 940. Secondary winding 922 is connected with a rectifying diode D1 and a capacitor C0. Load 900 is connected in parallel with capacitance C0. Auxiliary winding 923 is coupled to a voltage divider including a first resistor R1 and second resistor R2. The voltage divider is connected to a second input terminal FB of d the power switch control circuit 940. An output terminal out of power switch control circuit 940 is connected to power switch 930.

As shown in FIG. 9, the first input terminal CS is used to input the current flowing through primary winding 921 through power switch current 930 as detected by resistor R5. The second input terminal FB is configured to receive a feedback signal that represents the state of secondary winding 922. The feedback signal is detected by the voltage divider resistors to reflect the on/off state of the rectifier diode on the secondary side. Power switch control circuit 940 uses the signals at the CS and FB terminals control the on/off of power switch 930 in order to adjust the current flow through the primary winding 921 and load 900. Control circuit 940 is configured to cause the envelope of peak current in primary winding 921 to be in phase with the input alternating voltage Vac to enable the light emitting diodes to achieve a high power factor. In addition control circuit 940 is also configured to provide a constant average current to load 900 to avoid flickers in the light-emitting diodes.

Figure 10:
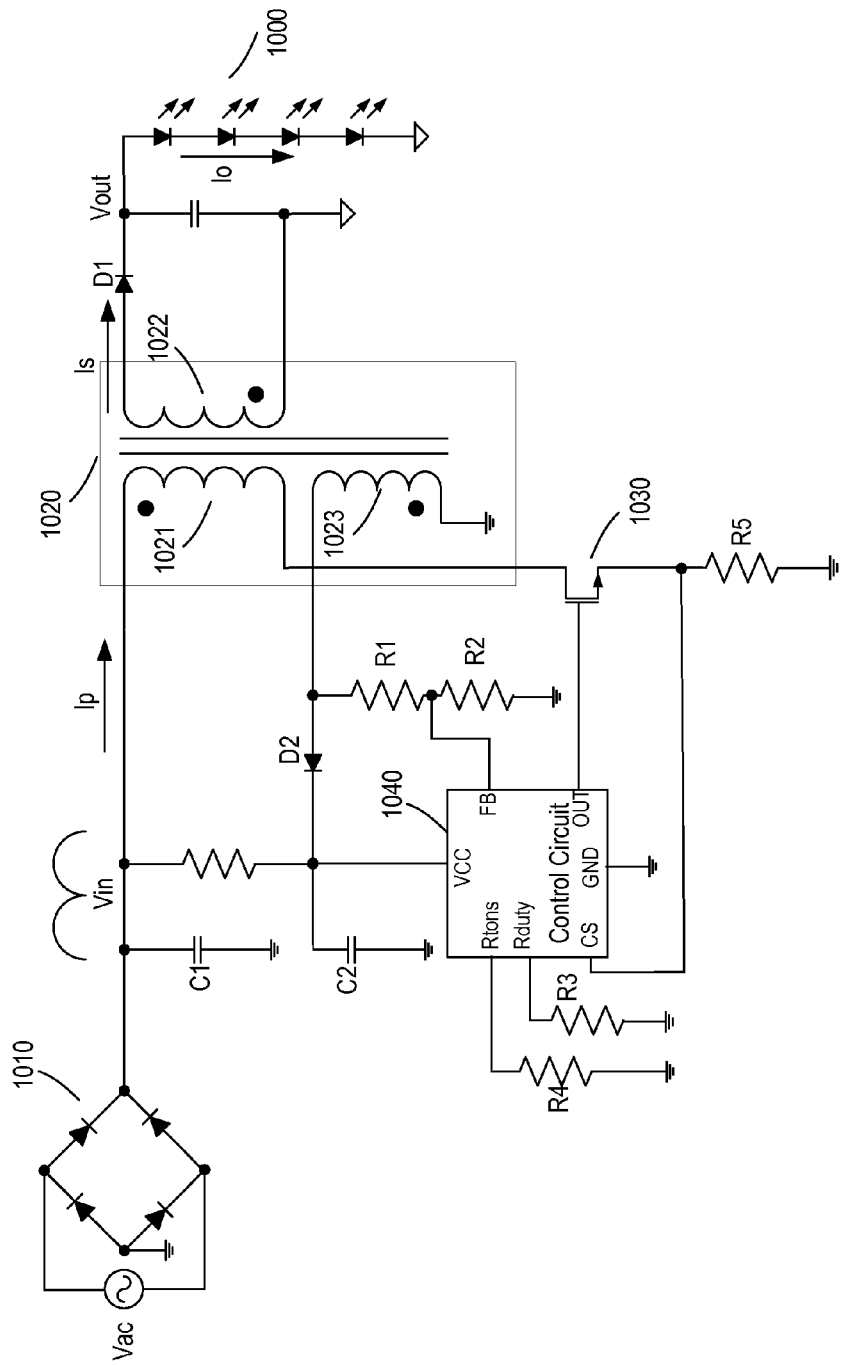
FIG. 10 is a simplified schematic diagram illustrating an SMPS having a transformer as the energy transfer unit according to another embodiment to the present invention.

FIG. 10 is a simplified schematic diagram illustrating an SMPS having a transformer as the energy transfer unit according to another embodiment to the present invention. FIG. 10 shows a rectifier circuit 1010, a transformer 1020, a power switch 1030 and a power switch control circuit 1040. As shown in FIG. 10, control circuit 1040 is similar to the switching control circuit integrated circuit chip shown in FIG. 8, in which the operating mode of the switching power supply by adjusting the relative resistance of the external charging resistor R4 (RTons) and discharging resistor R3 (Rduty).

Figure 11:
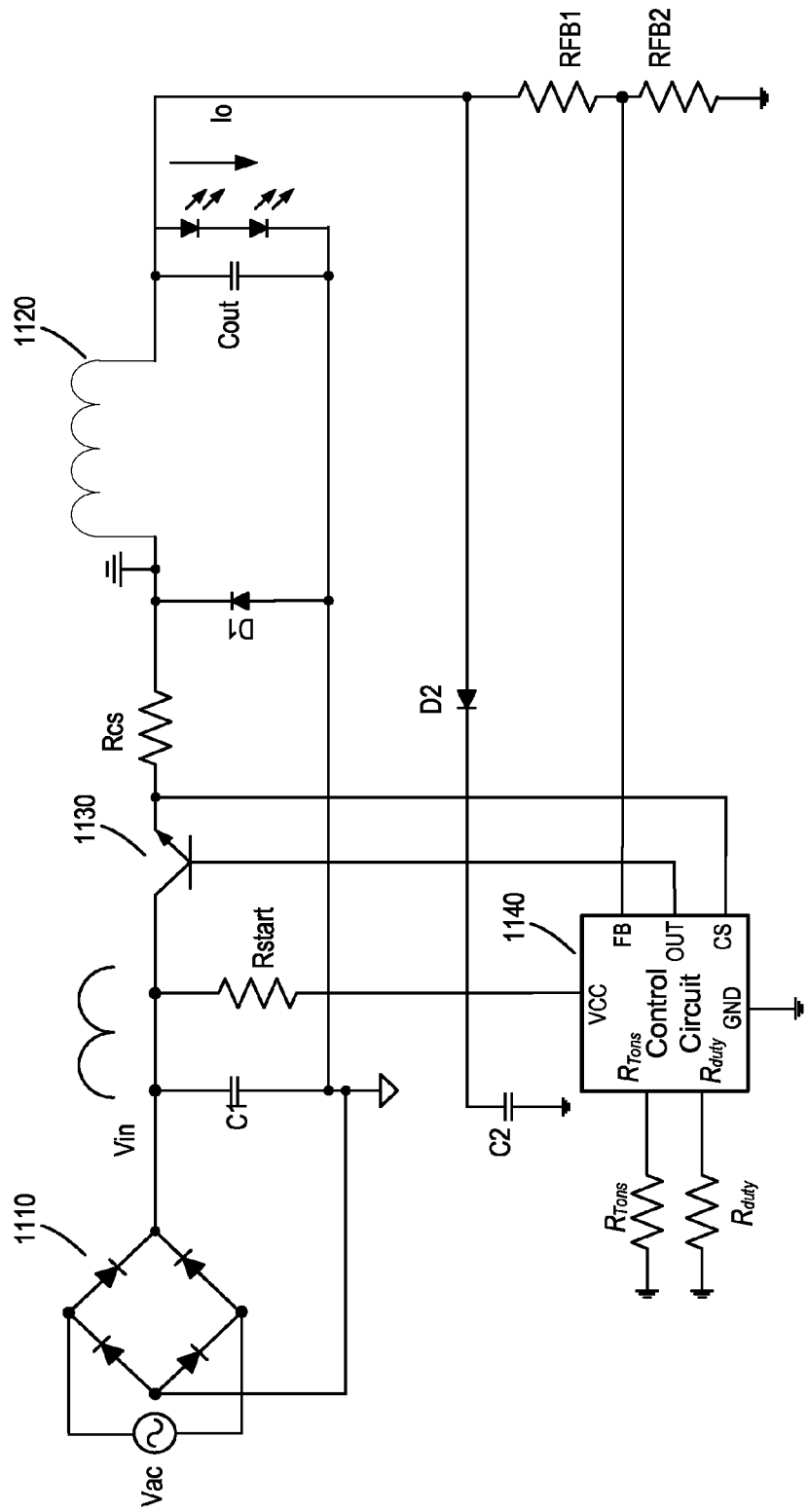
FIG. 11 is a simplified schematic diagram illustrating an SMPS having an inductor as the energy transfer unit according to an embodiment to the present invention.

FIG. 11 is a simplified schematic diagram illustrating an SMPS having an inductor as the energy transfer unit according to an embodiment to the present invention. FIG. 11 shows a high buck converter (High-side buck system), which includes a rectifier circuit 1110, an inductor 1120, a capacitor Cout, a power switch 1130, and a power switch control circuit 1140. In this embodiment, the power switch control circuit 1140 is similar to the control circuit integrated chip depicted in FIG. 8.

Figure 12:
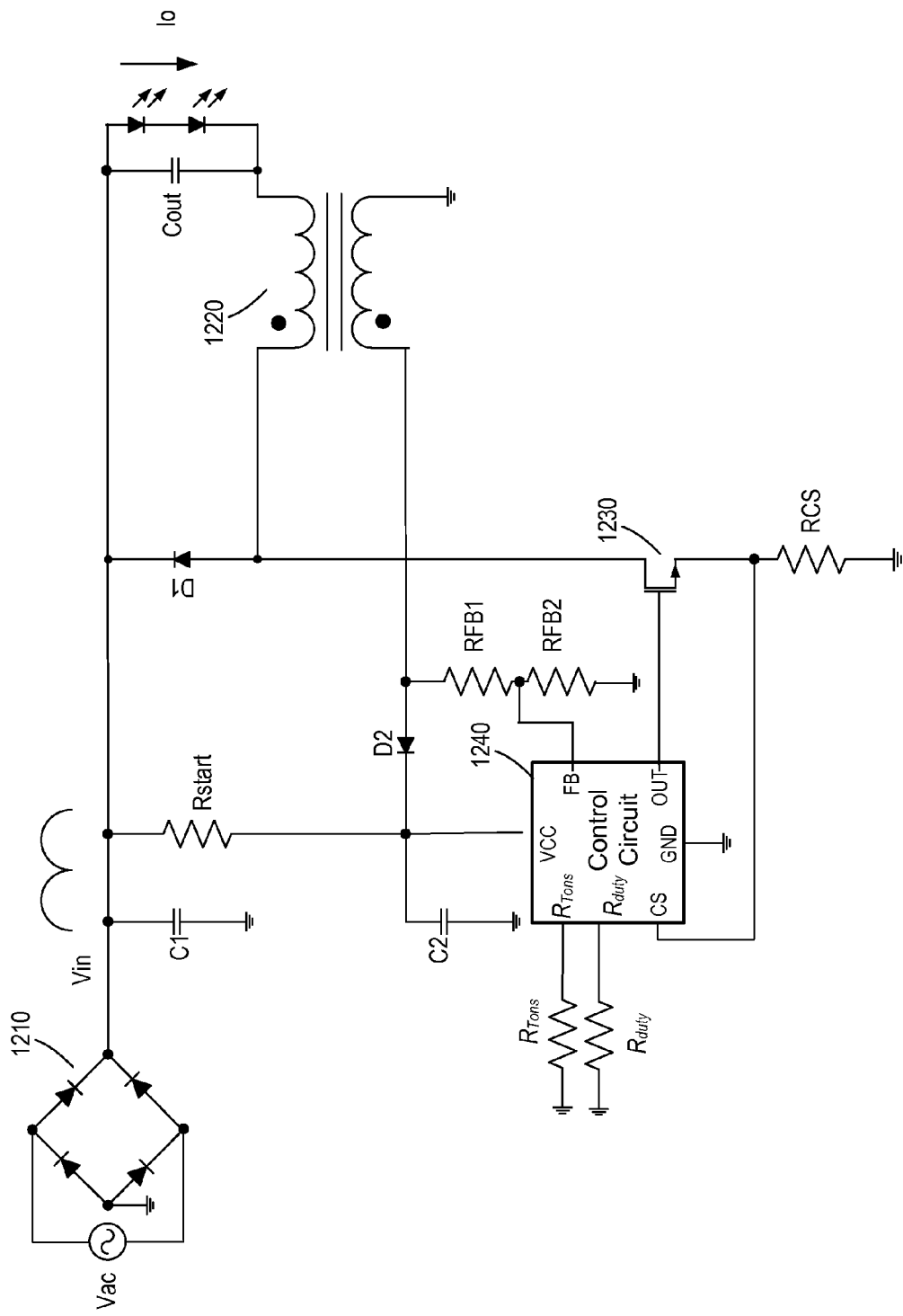
FIG. 12 is a simplified schematic diagram illustrating an SMPS having a transformer as the energy transfer unit according to another embodiment to the present invention.

FIG. 12 is a simplified schematic diagram illustrating an SMPS having a transformer as the energy transfer unit according to another embodiment to the present invention. FIG. 12 shows a lower end buck converter (Low-side buck system), which includes a rectifier circuit 1210, a transformer 1220, a capacitor Cout, a power switch 1230, and a power switch control circuit 1240. In this embodiment, the power switch control circuit 1240 is similar to the control circuit integrated chip depicted in FIG. 8.

Figure 13:
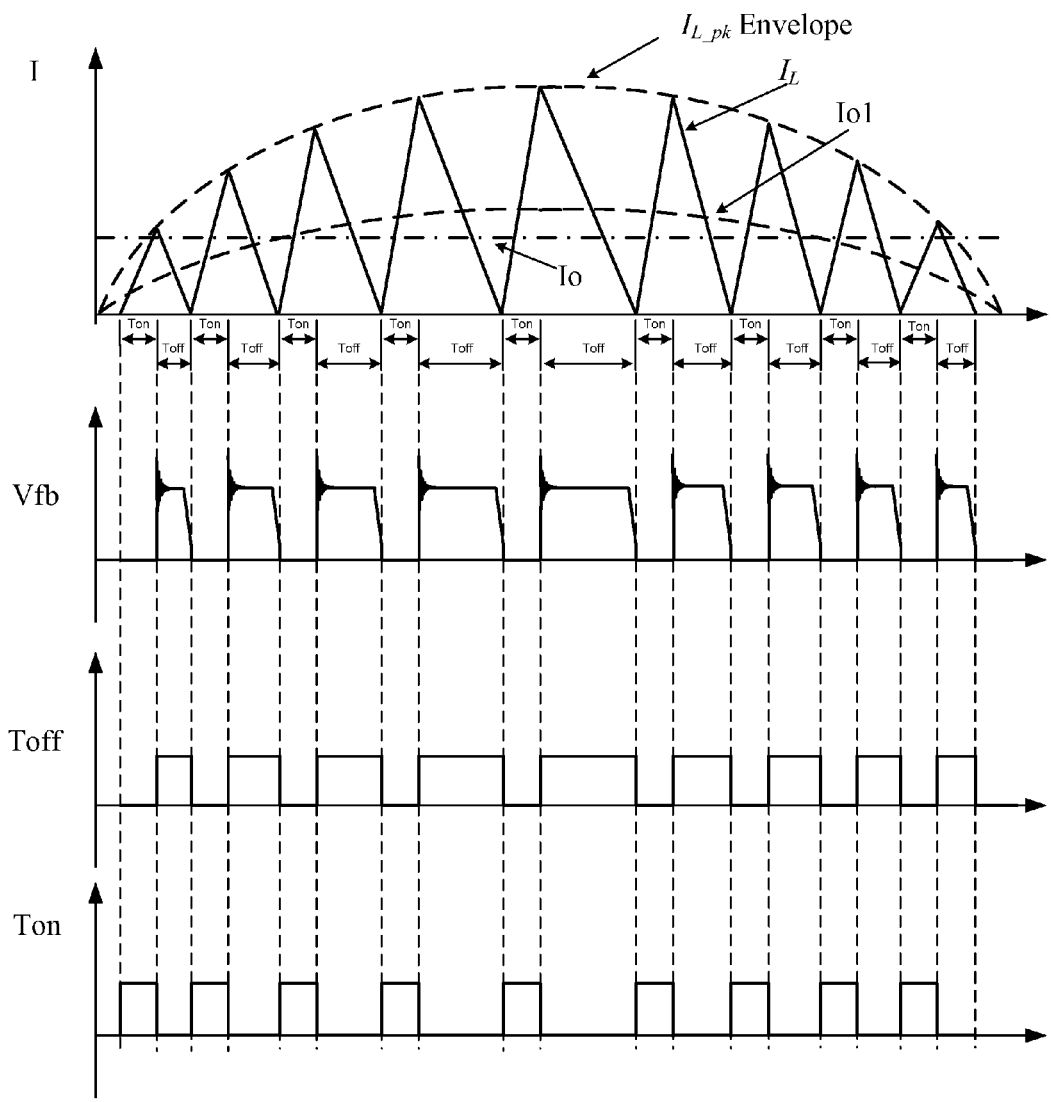
FIGS. 13-15 are waveform diagram illustrating the operation of switch mode power supplies according to various embodiments of the present invention.
Figure 14:
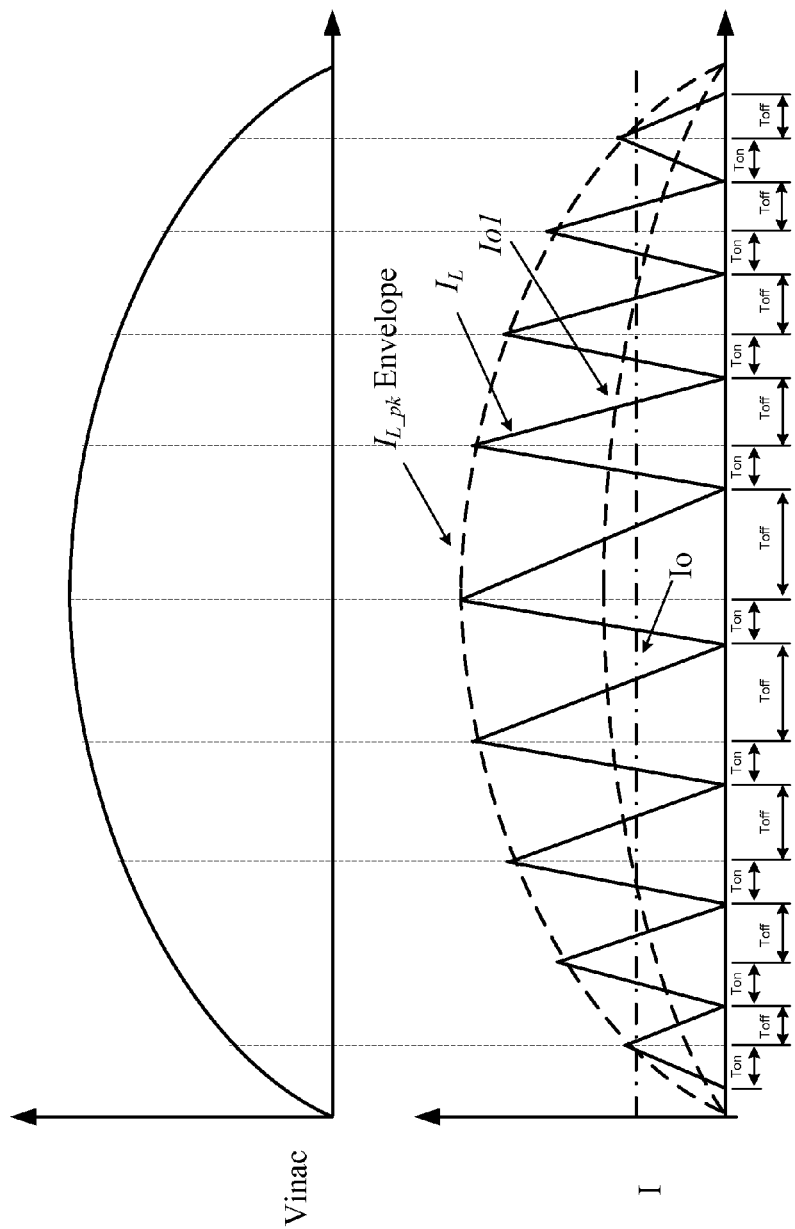
Figure 15:
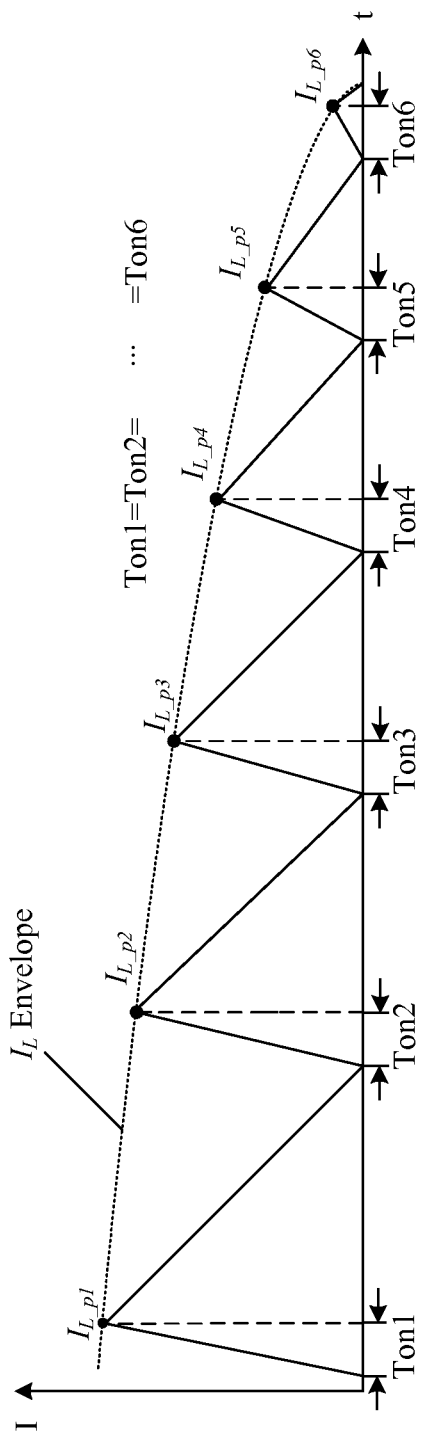

FIGS. 13-15 are waveform diagram illustrating the operation of switch mode power supplies according to various embodiments of the present invention.

FIG. 13 is a waveform diagram illustrating waveforms of several signals in a buck converter operating in boundary conduction mode (BCM). The power switch switching cycle T is equal to the conduction time of the power switch Tonp and the conduction time of the secondary rectifier time Tons, T=Tonp+Tons. Vfb is a feedback signal indicating current flow in the output of the power supply.

Power switch conduction time is Ton=L*Ipp/Vinpk.

Secondary rectifier conduction time is Tons=L*Ipp*sin θ/Vo.

The power switch switching period is T=Lp*Ipp/Vinpk+ Lp*Ipp*sin θ/Vo.

The envelope of peak inductor current pulse is defined by the following expression:

$$Ipp(t)=(½)*\pi*Io*|\sin(2\pi ft)|.$$

where f is the frequency of input AC voltage of the switching power supply, and Io is the expected value of the average output current of the switching power supply.

FIG. 14 is a waveform diagram illustrating waveforms in a buck converter depicted in FIGS. 11 and 12 according to embodiments of the present invention. FIG. 14 shows the currents in the power supply I and the input AC voltage Vinac. As shown in FIG. 14, is the average current flowing through the light emitting diodes averaged over a time scale of greater than 10 ms. Io1 is the current flowing through the light-emitting diodes averaged over a smaller scales (much less than 10 milliseconds). $I_L$ is the instantaneous current flowing through the inductor. In embodiments of the invention, the magnitude of the long-time average output current can be determined from the desired brightness of the light emitting diodes. The short-time average current waveform Io1 can be obtained from the power factor requirement of the switching power supply and measured phase of the AC current. In an embodiment of the present invention, the waveform of Io1 can be chosen to approach (½)*π*Io*|sin (2πft)|, where f is the frequency of the input power source.

FIG. 15 is a waveform diagram illustrating the power switch turn-on time and turn-off time for the buck converters depicted in FIGS. 11 and 12. Let Va(t) be the amplitude of the rectified input AC voltage, then the rectified input voltage can be expressed as, $$Vin(t)=Va(t)*|\sin(2\pi ft)|$$

In order to obtain a constant output current, the inductor current is described by the envelope described by, $$ILp(t)=(½)*\pi*|\sin(2\pi ft)| \quad (1)$$

The short-time average (much shorter than 10 ms) of the output current is, $$Io1=(½)*\pi*Io*|\sin(2\pi ft)| \quad (2)$$

The long-time average of the output current is Io, $$(f)*\int_0^{1/f}(Io1)dt=(f)*(½)*\pi*Io*\int_0^{1/f}|\sin(2\pi ft)|dt=Io \quad (3)$$

In embodiments of the invention, the peak value of inductor current Ipp (t) follows the enveloped described by equation (1). Under such conditions, a desired constant output current Io can be obtained, with a high power factor.

Further, based on the following relationship, $$Vin(t)=Lp*Ipp(t)/Tonp$$

Tonp can be determined, which is the primary side on time. Tonp is duration after which the power switch is turned off. In some embodiments, the above description can be used to determine the reference signal Vref1 which is used to regulate the output of the SMPS, as described above in connection with FIGS. 2-6.

As described above, the envelope of the peak primary current Ipp (t) follow the same sinusoidal waveform and have the same phase angle. Even when the input AC voltage has different amplitude Va(t), the envelope of Ipp (t) remains the same. Under these conditions, the system maintains a high power factor and delivers a constant output current.

Because of persistence of vision effect, the human eye is incapable of distinguishing changes in brightness in a time scale of faster than 10 milliseconds. In embodiments of the present invention, a switching power supply system provides power for driving light emitting diodes such that the brightness of the light is constant to the human eye. In a time scale of less than 10 milliseconds, the average output current can be vary with time. The magnitude of the varying current is characterized by an envelope waveform that is in phase with the rectified input AC voltage. Similarly, the envelope of the peak points of the sawtooth current flowing through the power switch are in phase with the rectified input AC voltage, thus providing the high power factor.

Figure 16:
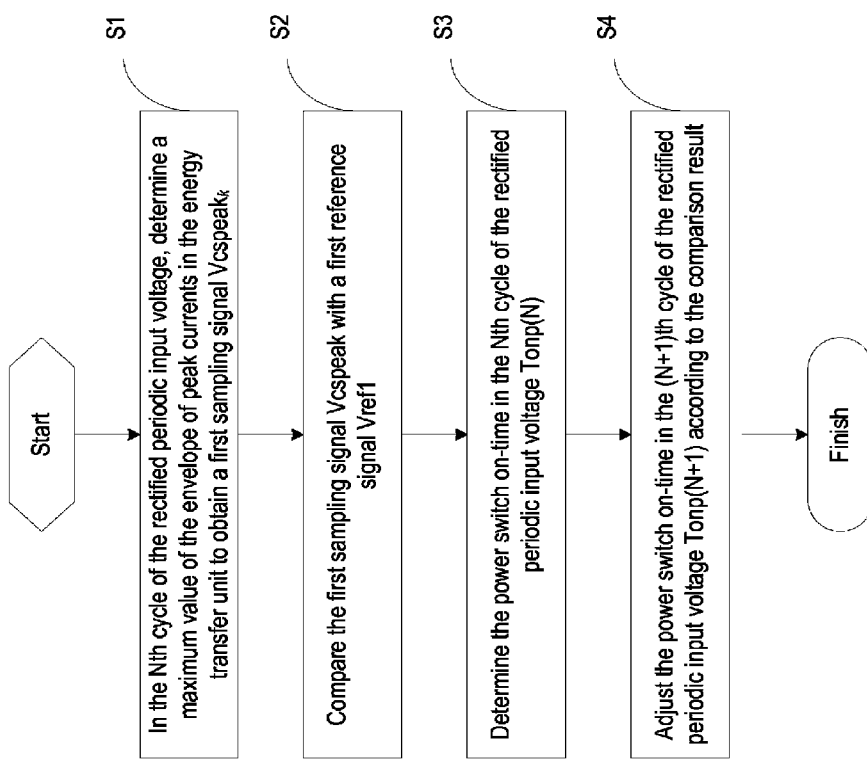
FIG. 16 is a flowchart illustrating a method for controlling a switch mode power supply according to an embodiment of the present invention.

FIG. 16 is a flowchart illustrating a method for controlling a switch mode power supply according to an embodiment of the present invention. As shown in FIG. 16, the method includes that following steps.

S1: In the Nth cycle of the rectified periodic input voltage, determine a maximum value of the envelope of peak currents in the energy transfer unit to obtain a first sampling signal Vcspeak;

S2: Compare the first sampling signal Vcspeak with a first reference signal Vref1;

S3: Determine the power switch on-time in the Nth cycle of the rectified periodic input voltage, Tonp(N); and S4: Adjust the power switch on-time in the (N+1)th cycle of the rectified periodic input voltage Tonp(N+1) according to the comparison result.

According to the method implemented in various embodiments of the invention, such as those illustrated in FIGS. 1-15, the output of the power supply is regulated to a target output value, and the current is in phase with the periodic input line voltage, resulting in a high power factor. In some embodiments, as shown in FIG. 3, when Vcspeak>Vref1 in the N-th frequency cycle, on-time adjustment circuit 103 causes Tonp (N+1)<Tonp (N), thereby reducing Vcspeak in the (N+1) th frequency cycle. When Vcspeak<Vref1 in the N-th frequency cycle, on-time adjustment circuit 103 causes Tonp(N+1)>Tonp (N), thereby increasing Vcspeak in the (N+1)th frequency cycle. When Vcspeak=Vref1, in the N-th frequency cycle, on-time adjustment circuit 103 causes Tonp (N+1)=Tonp (N). Thus, on-time adjustment circuit 103 is configured to cause Vcspeak in the (N+1) th cycle to be close to or equal to the first reference signal Vref1. In a specific embodiment, the next cycle on-time is determined according to the following equation, $$Tonp(N+1)/Tonp(N)=Vref1/Vcspeak.$$

Various embodiments of the present invention are described above. It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A controller for controlling a switched mode power supply (SMPS) that is configured to receive a rectified periodic input voltage, the controller comprising:
   a first input terminal for receiving information about a current flow through a power switch in the SMPS;
   a second input terminal for receiving information about an output of the SMPS; and
   an output terminal for providing a control signal to the power switch of the SMPS for turning on/off of the power switch multiple times in a cycle of the rectified periodic input voltage;
   wherein the controller is configured to provide a constant power switch turn-on time in a given cycle of the rectified periodic input voltage, and the controller is configured to determine a maximum value of the envelope of peak currents through the power switch in the given cycle, the envelope of peak currents through the power switch being in phase with the rectified periodic input voltage;
   wherein the controller is configured to maintain a constant output of the SMPS by adjusting the power switch turn-on time for the next cycle of the rectified periodic input voltage based on comparison of a first reference signal with the determined maximum value of the envelope of peak currents through the power switch in the given cycle.

2. The controller of claim 1, wherein the controller is configured to:
   increase the power switch turn-on time for the next cycle, when the maximum value of the envelope of peak currents through the power switch in the given cycle is lower than the first reference signal; and
   decrease the power switch turn-on time for the next cycle, when the maximum value of the envelope of peak currents through the power switch in the given cycle is higher than the first reference signal.

3. The controller of claim 1, wherein the power switch turn-on time for the given cycle (Tonp(N) for the Nth cycle), the power switch turn-on time for the next cycle (Tonp(N+1) for the (N+1)th cycle), the first reference signal Vref1, and maximum value of the envelope of peak currents through the power switch in the given cycle Vcspeak are related by the following equation, $$Tonp(N+1)/Tonp(N)=Vref1/Vcspeak.$$

4. The controller of claim 1, wherein the controller is implemented in a single integrated circuit (IC) chip, the controller IC chip having a first resistor pin for coupling to an external charging resistor and a second resistor pin for coupling to an external discharging resistor;
   wherein:
   when the resistance of the charging resistor is equal to or smaller than the resistance of the discharging resistor, the power supply is configured to operate in boundary conduction mode (BCM); and
   when the resistance of the charging resistor is greater than the resistance of the discharging resistor, the power supply is configured to operate in discontinuous conduction mode (DCM).

5. The controller of claim 1, further comprising a power switch on-time adjustment circuit that includes:
   a first capacitor;
   a charging current source for charging the first capacitor, the charging current source being configured to provide a charging current that is related to the maximum value of the envelope of peak currents through the power switch;
   a discharging current source for discharging the first capacitor, the discharging current source being configured to provide a discharging current that is related to the first reference signal; and
   a comparator configured for comparing a voltage of the capacitor with a reference voltage, and configured for outputting a signal that is used to determine the power switch turn-on time for the next cycle of the rectified periodic input voltage.

6. The controller of claim 5, wherein the power switch on-time adjustment circuit further comprises:
   a first switch coupled between the charging current source and the first capacitor, and
   a second switch coupled between the discharging current source and the first capacitor,
   wherein the first switch is coupled to the power switch turn-on time for the next cycle of the rectified periodic input voltage, and the second switch is coupled to the power switch turn-on time for the given cycle of the rectified periodic input voltage.

7. The controller of claim 1, further comprising a power switch turn-off control circuit that includes:
   a second capacitor;
   a bias current source;
   a first switch coupling the second capacitor to a ground, the first switch being controlled by the power switch turn-on time for the given cycle of the rectified periodic input line voltage;
   a second switch coupling the second capacitor to the bias current source, the second switch being controlled by the power switch turn-on time for the next cycle of the rectified periodic input line voltage;
   a holding circuit coupled to the second capacitor; and
   a third capacitor coupled to the holding circuit.

8. The controller of claim 1, further comprising a power switch turn-on control circuit that includes:
   a timing capacitor;
   a charging current source coupled to the timing capacitor, wherein the charging current source is coupled to a signal representing a current in the power switch and a charging resistor;
   a discharging charging current source coupled to the timing capacitor, wherein the discharging current source is coupled to the first reference signal and a discharging resistor; and
   a comparator configured for comparing a voltage of the timing capacitor with a second reference signal, and configured for outputting a signal used in providing a power switch turn-on signal.

9. The controller of claim 8, wherein:
when the charging resistor is not greater than the discharging resistor, the power supply is configured to operate in boundary conduction mode (BCM); and
when the charging resistor is greater than the discharging resistor, the power supply is configured to operate in discontinuous conduction mode (DCM).

10. The controller of claim 8, wherein:
the charging current source is coupled to the timing capacitor through a first switch, and
the discharging charging current source is coupled to the timing capacitor through a second switch;
wherein the first switch in the power switch turn-on control circuit is coupled to an inverse of a secondary turn-on signal, and the second switch in the power switch turn-on control circuit is coupled to the secondary turn-on signal.

11. The controller of claim 8, wherein the discharging current source is coupled to the timing capacitor through a switch, and the switch is coupled to a secondary turn-on signal.

12. The controller of claim 8, wherein the controller is implemented in a single integrated circuit chip with the charging resistor and the discharging resistor implemented on chip, the integrated circuit chip having only five pins:
a first input pin for receiving information about the current flow through the power switch;
a second input pin for receiving information about the output of the SMPS;
an output pin for providing the control signal to a power switch of the SMPS;
a power supply pin; and
a ground pin.

13. The controller of claim 8, wherein the controller is implemented in a single integrated circuit chip with the charging resistor and the discharging resistor disposed external to the integrated circuit chip, integrated circuit chip having seven pins:
a first input pin for receiving information about the current flow through the power switch;
a second input pin for receiving information about the output of the SMPS;
an output pin for providing a control signal to a power switch of the SMPS;
a power supply pin;
a ground pin;
a first resistor pin for coupling to the external charging resistor; and
a second resistor pin for coupling to the external discharging resistor.

14. A switched mode power supply (SMPS), comprising:
a rectifying circuit for converting an AC input voltage to a rectified periodic input voltage;
an energy transfer unit including at least an inductor for coupling to the rectified periodic input voltage and for providing an output to a load;
a power switch coupled to the energy transfer unit for controlling a current flow in the inductor; and
a controller coupled to the power switch for controlling the o the power switch,
wherein the controller is configured to provide a constant power switch turn-on time in a given cycle of the rectified periodic input voltage, and the controller is configured to determine a maximum value of the envelope of peak currents through the power switch in the given cycle, the envelope of peak currents through the power switch being in phase with the rectified periodic input voltage;
wherein the controller is configured to maintain a constant output of the SMPS by adjusting the power switch turn-on time for the next cycle of the rectified periodic input voltage based on comparison of a first reference signal with the determined maximum value of the envelope of peak currents through the power switch in the given cycle.

15. The power supply of claim 14, wherein the power switch turn-on time for the given cycle Tonp(N), the power switch turn-on time for the next cycle Tonp(N+1), the first reference signal Vref1, and maximum value of the envelope of peak currents through the power switch in the given cycle Vcspeak are related by the following equation, $$Tonp(N+1)/Tonp(N)=Vref1/Vcspeak.$$

16. The power supply of claim 14, wherein the controller is implemented in a single integrated circuit (IC) chip, the controller IC chip having a first resistor pin for coupling to an external charging resistor and a second resistor pin for coupling to an external discharging resistor;
wherein:
when the charging resistor is equal to or smaller than the discharging resistor, the power supply is configured to operate in boundary conduction mode (BCM); and
when the charging resistor is greater than the discharging resistor, the power supply is configured to operate in discontinuous conduction mode (DCM).

17. The power supply of claim 14, further comprising a power switch on-time adjustment circuit that includes:
a first capacitor;
a charging current source for charging the first capacitor, the charging current source being configured to provide a charging current that is related to the maximum value of the envelope of peak currents through the power switch;
a discharging current source for discharging the capacitor, the discharging current source being configured to provide a discharging current that is related to the first reference signal; and
a comparator configured for comparing a voltage of the capacitor with a reference voltage, and configured for outputting a signal that is used to determine the power switch turn-on time for the next cycle of the rectified periodic input voltage.

18. The power supply of claim 14, further comprising a power switch turn-on control circuit that includes:
a timing capacitor;
a charging current source coupled to the timing capacitor, wherein the charging current source is related to a current in the power switch and a charging resistor;
a discharging charging current source coupled to the timing capacitor, wherein the discharging current source is related to the first reference signal and a discharging resistor; and
a comparator configured for comparing a voltage of the timing capacitor with a second reference signal, and configured for outputting a signal used in providing a power switch turn-on signal.

19. The power supply of claim 18, wherein:
when the charging resistor is not greater than the discharging resistor, the power supply is configured to operate in boundary conduction mode (BCM); and when the charging resistor is greater than the discharging resistor, the power supply is configured to operate in discontinuous conduction mode (DCM).

20. The power supply of claim 14, wherein the controller is implemented in a single integrated circuit chip with the charging resistor and the discharging resistor implemented on chip, the integrated circuit chip having only five pins:
   a first input pin for receiving information about the current flow through the power switch;
   a second input pin for receiving information about the output of the SMPS;
   an output pin for providing the control signal to a power switch of the SMPS;
   a power supply pin; and
   a ground pin.

21. The power supply of claim 14, wherein the energy transfer unit comprises a transformer, and the SMPS is configured as a flyback converter.

22. The power supply of claim 14, wherein the energy transfer unit comprises a single inductor, and the SMPS is configured as a high-side buck converter.

23. The power supply of claim 14, wherein the energy transfer unit comprises a transformer, and the SMPS is configured as a low-side buck converter.

* * * * *